(12) United States Patent
Romeu et al.

(10) Patent No.: US 11,148,784 B2
(45) Date of Patent: Oct. 19, 2021

(54) PROPELLER SYSTEM WITH DIRECTIONAL THRUST CONTROL

(71) Applicant: ALLUVIONIC, INC., Melbourne, FL (US)

(72) Inventors: Ricardo Romeu, Melbourne, FL (US); William Eric Holland, Indian Harbour Beach, FL (US)

(73) Assignee: Alluvionic, Inc., Melbourne, FL (US)

( * ) Notice: Subject to any disclaimer, the term of this patent is extended or adjusted under 35 U.S.C. 154(b) by 257 days.

(21) Appl. No.: 16/402,691

(22) Filed: May 3, 2019

(65) Prior Publication Data

US 2019/0263503 A1 Aug. 29, 2019

Related U.S. Application Data

(63) Continuation-in-part of application No. 15/899,140, filed on Feb. 19, 2018, now Pat. No. 10,800,513.

(60) Provisional application No. 62/479,355, filed on Mar. 31, 2017.

(51) Int. Cl.
*B64C 11/44* (2006.01)
*B64C 11/06* (2006.01)

(52) U.S. Cl.
CPC ............. *B64C 11/44* (2013.01); *B64C 11/06* (2013.01)

(58) Field of Classification Search
CPC .................................. B64C 11/44; B64C 11/06

USPC ....................................................... 416/134 A
See application file for complete search history.

(56) References Cited

U.S. PATENT DOCUMENTS

| | | | | |
|---|---|---|---|---|
| 5,967,749 A * | 10/1999 | Eaves | ...................... | B63H 3/06 416/155 |
| 7,075,200 B2 * | 7/2006 | Minato | .................. | H02K 41/03 310/156.38 |
| 8,008,822 B2 * | 8/2011 | Hopewell | ............. | B64C 11/308 310/115 |
| 8,568,088 B2 * | 10/2013 | Richter | ................... | F01D 25/06 415/119 |
| 8,674,538 B2 * | 3/2014 | Lugg | ..................... | F03D 1/0666 290/55 |

* cited by examiner

*Primary Examiner* — Michael L Sehn
(74) *Attorney, Agent, or Firm* — Daniel C. Pierron; Widerman Malek, PL

(57) ABSTRACT

A propeller system including a propeller including a central attachment member and a plurality of blade apparatuses, each including a blade body attached to the central attachment member and a magnetic coupling member attached to a radially outward end of the blade body. The propeller system further comprises a propeller frame configured to at least partially circumscribe the magnetic coupling member of each blade apparatus and a plurality of electromagnets positioned on the propeller frame and operable to generate magnetic fields to suspend the magnetic coupling members, laterally translate the magnetic coupling members, rotate the magnetic coupling members along the radial axis of the propeller system, thereby rotating the blade bodies.

19 Claims, 10 Drawing Sheets

PROPELLER SYSTEM WITH DIRECTIONAL THRUST CONTROL

RELATED APPLICATIONS

This application is a continuation-in-part and claims priority under 35 U.S.C. § 120 of U.S. patent application Ser. No. 15/899,140 filed on Feb. 19, 2018 and titled Propeller System with Directional Thrust Control, which in turn claims the benefit under 35 U.S.C. § 119(e) of U.S. Provisional Patent Application Ser. No. 62/479,355 filed on Mar. 31, 2017 and titled Aircraft Propeller System with Directional Thrust Control, the entire contents of which are incorporated herein by reference.

FIELD OF THE INVENTION

The present invention relates to propeller systems for providing directional thrust and control of the same.

BACKGROUND

Propeller systems for generating thrust in a forward direction, i.e. along a longitudinal axis of the vehicle, have uniformly generated that thrust solely collinearly with or parallel with the longitudinal axis. Pitch, yaw, and roll control has been addressed solely by flight control surfaces (e.g., wing, aileron, tail, elevator, rudder, stabilizer, etc.). Systems that do utilize forward thrust direction but have the capability of generating thrust at an angle to the longitudinal axis, such as the V-22 Osprey, rely on a tiltrotor mechanism to tilt the entire propeller assembly, requiring complicated and heavy mechanical systems, resulting in overall performance limitations for the vehicle. As a result, heavy flight control surfaces have been needed to achieve satisfactory flight dynamics. There is a need in the art for a propeller system capable of generating thrust vectored at an angle to the longitudinal axis of the vehicle to which it is attached without incurring additional costs in terms of complexity and weight required by tiltrotor systems.

Systems where thrust is generated at an angle to the longitudinal axis of the vehicle, such systems rely principally also rely on the propellers for generating lift instead of a flight control surface. These systems include helicopters, which employ a cyclic variable pitch propeller system. There has never been any motivation to employ such a variable pitch propeller system in a vehicle utilizing flight control surfaces as described above. Additionally, solutions employed to accomplish cyclic pitch variation have necessarily tied the angle attack of the propellers as they complete a revolution. That is to say, the angle of attack of the individual propellers is not independently controllable. This results in limiting the thrust vectors capable of being generated. Accordingly, there is a need in the art for a propeller system that allows for independent control of the angle of attack of each individual propeller blade of a propeller system.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a propeller system comprising a propeller comprising a central attachment member positioned at a rotational axis of the propeller and a plurality of blade apparatuses, each blade apparatus comprising a blade body attached to the central attachment member such that each blade apparatus may rotate about a radial axis of the propeller system independent of each of the central attachment member and each other blade apparatus of the plurality of blade apparatuses and a magnetic coupling member attached to a radially outward end of the blade body such that rotation of the magnetic coupling member along the radial axis of the propeller system may similarly rotate the blade body and lateral movement of the magnetic coupling member causes the blade body to rotate about the rotational axis of the propeller. The propeller system further comprises a propeller frame configured to at least partially circumscribe the magnetic coupling member of each blade apparatus and defining an aperture within which each of the central attachment member and the plurality of blade apparatuses are positioned and a plurality of electromagnets positioned on the propeller frame and operable to generate magnetic fields to suspend the magnetic coupling members, laterally translate the magnetic coupling members, rotate the magnetic coupling members along the radial axis of the propeller system.

In some embodiments, there may be a ratio of a maximum blade width between a leading edge of the blade body and a trailing edge of the blade body to a blade length of the blade body is within a range from 0.4 to 0.65. In further embodiments, the ratio between the maximum blade width to the blade length is within a range from 0.54 to 0.56.

In some embodiments, there may be a ratio of a maximum blade thickness and a maximum blade width between a leading edge of the blade body and a trailing edge of the blade body is within a range from 0.15 to 0.22. In further embodiments, the ratio of the maximum blade thickness and the maximum blade width is within a range from 0.18 to 0.19.

In some embodiments, the plurality of electromagnets may comprise a first subset of electromagnets positioned to define a first annulus that defines a plane that is offset from a rotational plane defined by the plurality of blade apparatuses in a first direction and a second subset of electromagnets positioned to define a second annulus that defines a plane that is offset from the rotational plane defined by the plurality of blade apparatuses in a second direction that is opposite the first direction.

In some embodiments, the propeller system may further comprise a mounting frame rotationally coupled to the propeller frame.

In some embodiments, the propeller system may further comprise an inlet cowling attached to and extending proximally from the propeller frame and an outlet cowling attached to and extending distally from the propeller frame.

In some embodiments, the propeller frame may have an outer diameter equal to or less than 36 inches.

In some embodiments, the propeller system may further comprise an inner wall positioned intermediate the plurality of electromagnets and the blade body of the plurality of blade apparatuses such that a gap is defined between the radially outward end of the blade body of each blade apparatus the inner wall, defining an airfoil gap.

In some embodiments, the central attachment member may be formed of a material having a density of less than five grams per cubic centimeter.

In some embodiments, the propeller system may further comprise a power source coupled to the plurality of electromagnets and configured to provide power to the plurality of electromagnets for generation of magnetic fields thereby and a controller coupled to the power source and configured to control operation of the plurality of electromagnets. The magnetic coupling members may be configured to be oriented in one of a plurality of rotational orientations. The controller may be configured to operate the plurality of electromagnets to generate magnetic fields operable to rotate the magnetic coupling members between rotational orientations. In further embodiments, the controller may be configured to operate the plurality of electromagnets to generate magnetic fields to rotate the magnetic coupling members between rotational orientations as the propeller rotates such that an effective rotational orientation of magnetic coupling members over the course of at least a partial rotation of the propeller is between two rotational orientations.

In further embodiments, the propeller system may further comprise a mounting frame rotationally coupled to the propeller frame and a coupling apparatus configured to rotationally couple the mounting frame to the propeller frame having a locked configuration and an unlocked configuration. The propeller frame may be able to rotate with respect to the mounting frame when the coupling apparatus is in the unlocked configuration. Additionally, the propeller frame may be prevented from rotating with respect to the mounting frame.

In some embodiments, the magnetic coupling member may comprise a body member comprising a circular perimeter, a plurality of recesses formed in an exterior surface about the perimeter of the body member, and a plurality of permanent magnets, each permanent magnet being positioned and retained within a recess of the plurality of recesses.

DETAILED DESCRIPTION OF THE INVENTION

Figure 1:
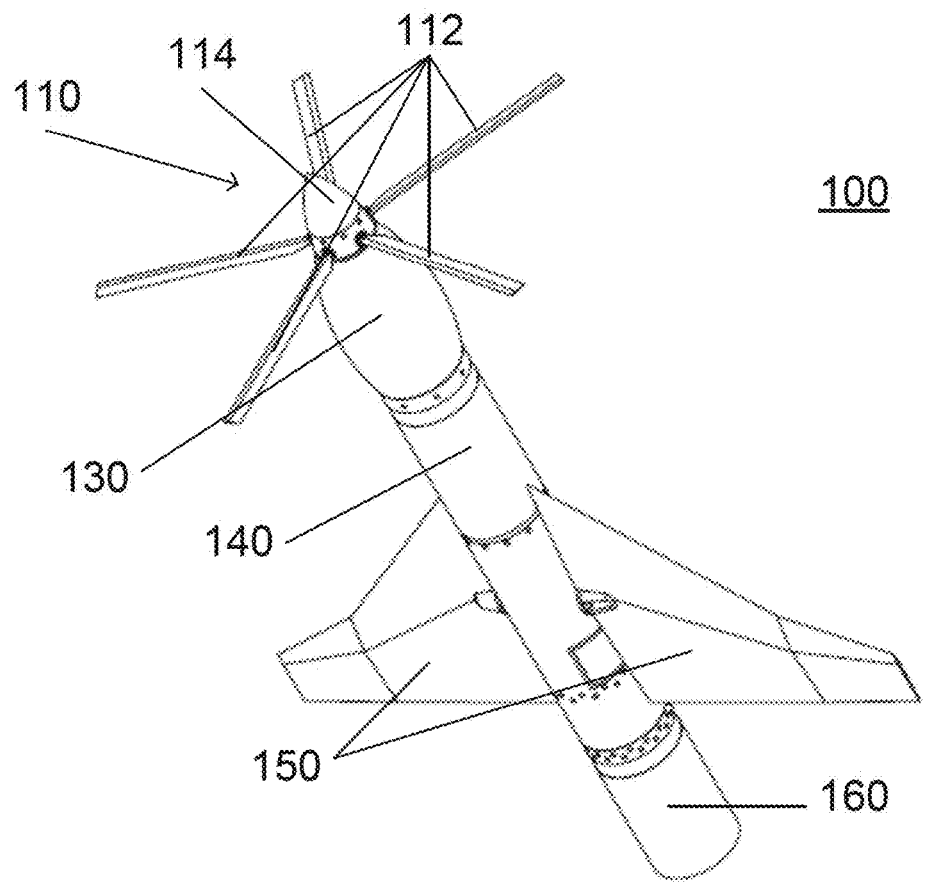
FIG. 1 is a perspective view of a vehicle comprising an aircraft propeller system according to an embodiment of the invention.
Figure 2:
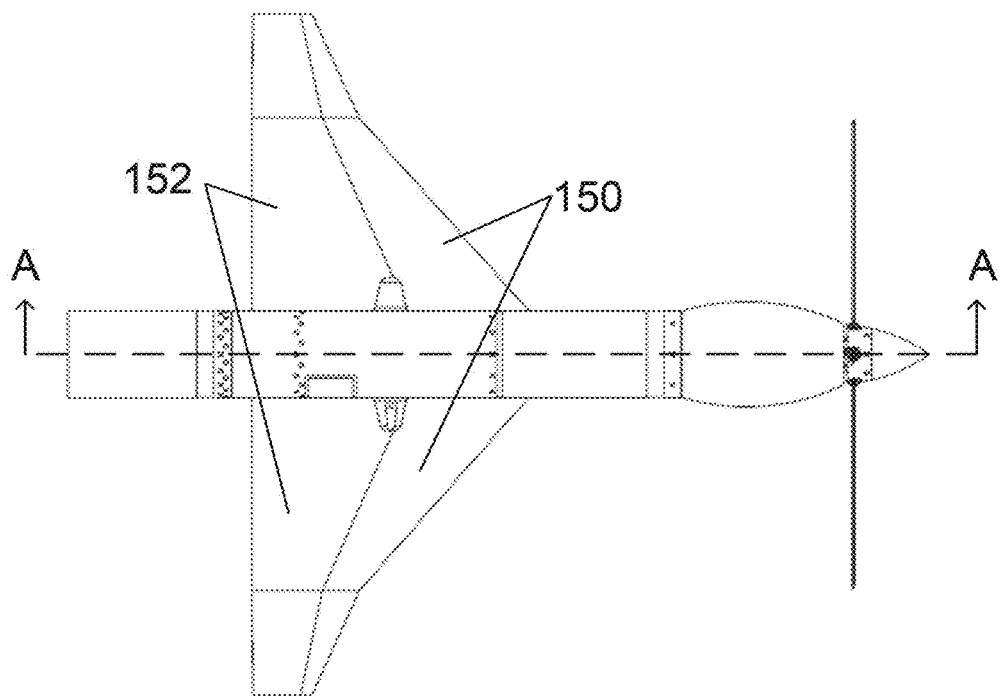
FIG. 2 is a top view of the vehicle of FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a system for dynamically varying and controlling the direction of thrust generated by a propeller. Furthermore, an embodiment of the invention provides an autonomous aviation device comprising a system for dynamically varying and controlling the direction of thrust generated by a propeller. The use of such a propeller system may reduce the control surface area needed to maintain control of the aviation device, for example reducing or eliminating the need for an empennage while operating at a minimum controllable speed, such as during take-off and landing. This results in achieving a reduction of aerodynamic drag when operating at higher speeds, such as during a cruise portion of flight.

Referring now to FIGS. 1-5, a vehicle 100 according to an embodiment of the invention is presented. The vehicle 100 may be an unmanned aircraft system (UAS), commonly known as a drone. It is contemplated and included within the scope of the invention that this embodiment is exemplary only, and the propeller systems disclosed herein may be employed in manned aircraft systems, multiple-propeller systems, and any other propeller-driven vehicles.

The vehicle 100 may comprise a propeller system 110, a motor housing 130, a fuselage 140, one or more wings 150, and a rear section 160. In the present embodiment, the vehicle does not comprise an empennage; the traditional aspects of flight control managed by an empennage are managed by the propeller system of the vehicle 100 as will be described herein below.

The wings 150 may comprise one or more control surfaces 152. The control surfaces 152 may be reoriented, either individually or collectively, to change the aerodynamic profile of the wings 150.

The propeller system 110 may comprise a plurality of blades 112. The present embodiment depicts a propeller system comprising five blades; it is contemplated and included within the scope of the invention that any number of blades may be comprised by the plurality of blades 112. The plurality of blades 112 may be formed of any material as is known and used in the construction of propeller blades, including, but not limited to, composite materials. The propeller system 110 may further comprise a hub housing 114.

Figure 4:
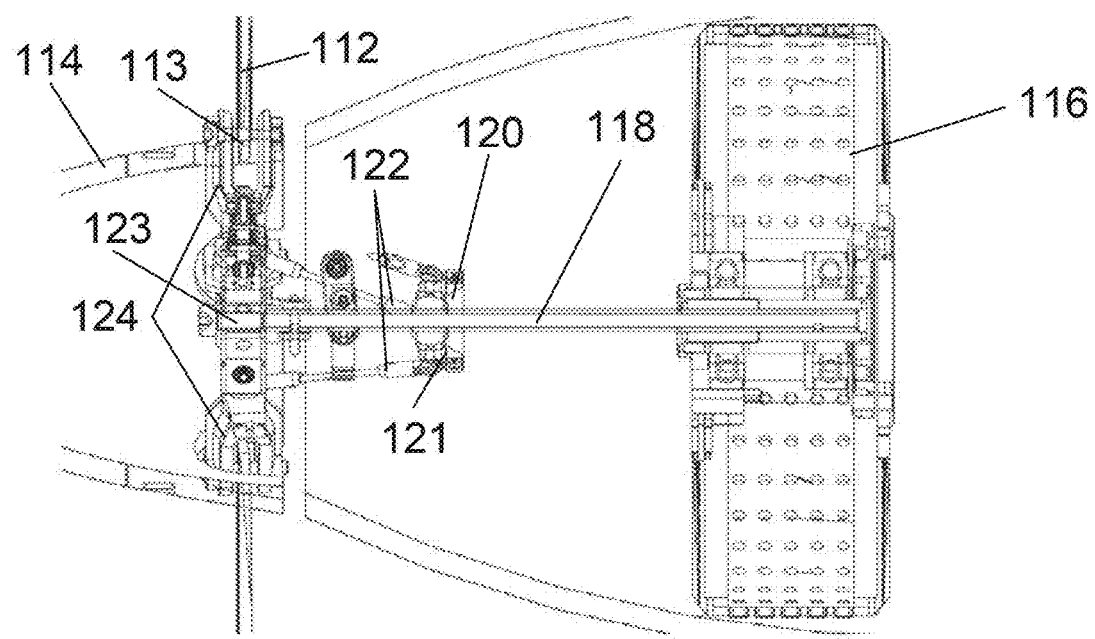
FIG. 4 is a portion of the sectional view of FIG. 3 depicting a portion of the aircraft propeller system.
Figure 5:
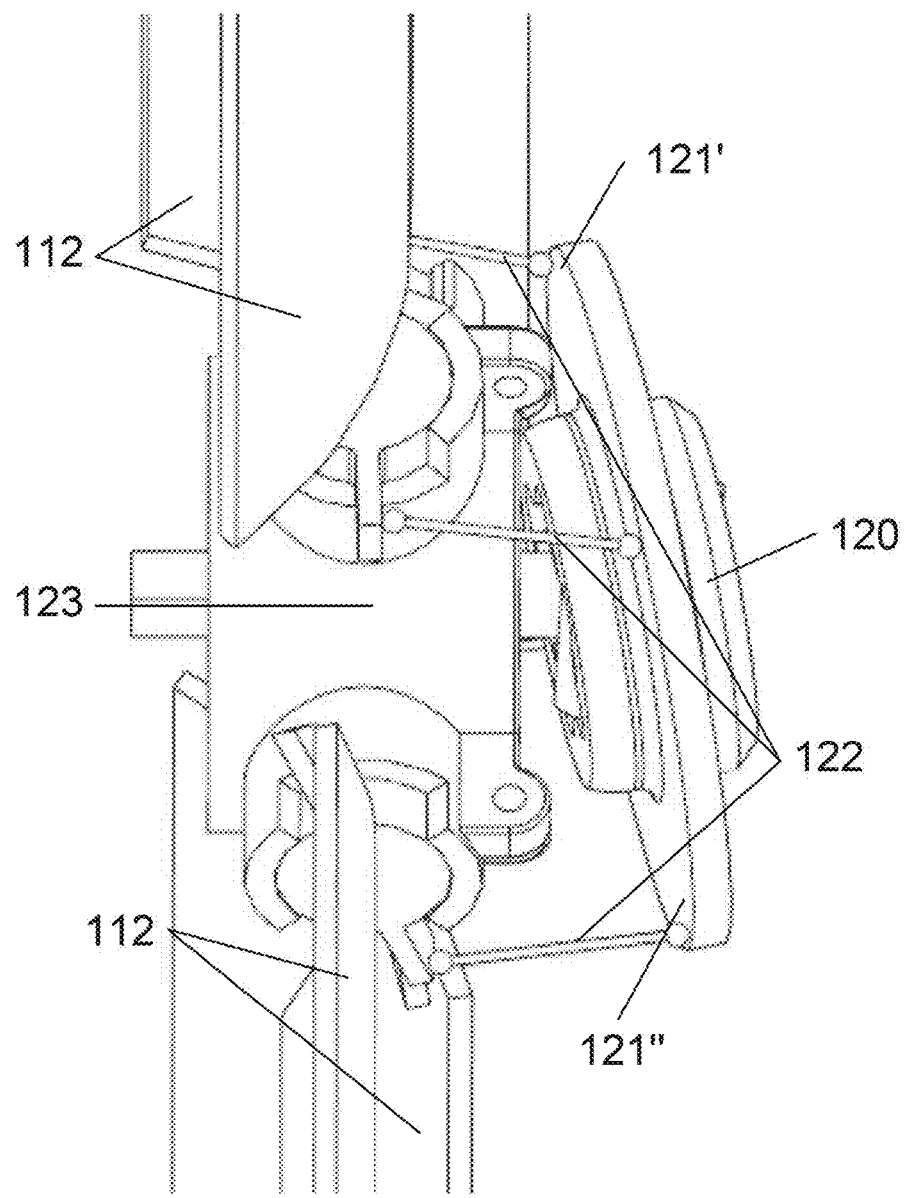
FIG. 5 is a partial view of a propeller system according to an embodiment of the invention.
Figure 6:
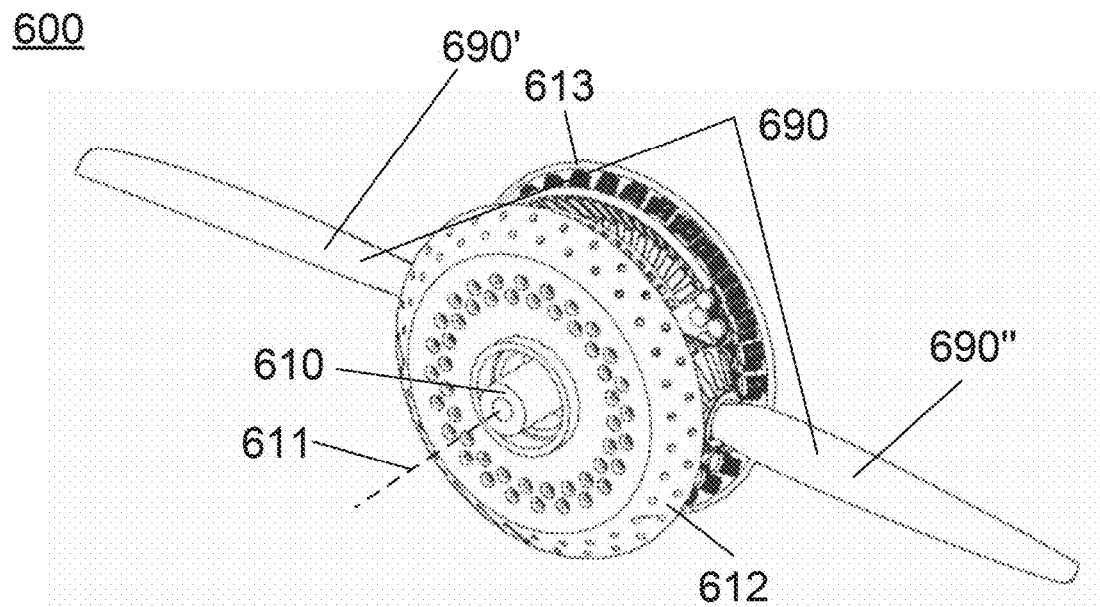
FIG. 6 is a perspective view of a propeller system according to an embodiment of the invention.

Referring now specifically to FIGS. 4-5, additional aspects of the propeller system 110 will be discussed. The propeller system 110 may further comprise a motor 116, a drive shaft 118, and a swash plate 120. The motor 116 may be any type of electric motor as is known in the art, including, but not limited to, brushless motors, brushed motors, switched reluctance motors, and the like. Additionally, the propeller system 110 may further comprise a plurality of linkages 122 configured to interface at one end to the swash plate 120, specifically to a linkage interface surface 121 comprised thereby. The propeller system 110 may comprise a number of linkages 122 to correspond to each blade of the plurality of blades 112. The propeller system 110 may further comprise a hub 123 and a plurality of blade attachment apparatuses 124. The hub 123 may be attached to the drive shaft 118 and may be operable to rotate when the drive shaft 118 rotates. The plurality of blade attachment apparatuses 124 may be configured to attach at one end to the hub 123, at another end to a root 113 of a blade 112, and at some location therebetween to an end of a linkage 122 opposite the end of the linkage 122 that attaches to the swash plate 120.

The plurality of blade attachment apparatuses 124 may further be configured to attach to the plurality of linkages 122. Similar to the plurality of linkages 122, the propeller system 110 may comprise a number of blade attachment apparatus 124 to correspond to each blade of the plurality of blades 112. The attachment between the hub 123 and the plurality of blade attachment apparatuses 124 may be such that each blade attachment apparatus 124 may rotate about a rotational axis that may be orthogonal to the longitudinal axis of the drive shaft 118 and/or parallel to or co-linear with a longitudinal axis of the blade 112 attached thereto, defined as the blade rotational axis.

The hub 123 may be rotated by the drive shaft 118 and in turn may cause the plurality of blade attachment apparatuses 124 to be rotated. This, in turn, may cause the plurality of linkages 122 to rotate. The interface between the plurality of linkages 122 and the linkage interface surface 121 may be such that the plurality of linkages 122 may remain interfaced with the linkage interface surface 121 while still being rotated. Accordingly, the linkage interface surface 121 may continuously exert a force on the plurality of linkages 122 as the plurality of linkages 122 rotate, as will be discussed in greater detail hereinbelow.

The swash plate 120 may be translated along a longitudinal axis of the drive shaft 118 to control the pitch of all the plurality of blades 112 simultaneously. The translation of the swash plate 120 may cause the plurality of linkages 122 to exert a force on the plurality of blade attachment apparatuses 124. The connection between the plurality of linkages 122 and the plurality of blade attachment apparatuses 124 may be such that force exerted by the plurality of linkages 122 to cause the plurality of blade attachment apparatuses 124 to rotate about the blade rotational axis, concordantly causing the plurality of blades 112 to similarly rotate, altering the pitch of the plurality of blades 112. The pitch of a propeller blade is known in the art to mean the distance a propeller would move in one revolution if it were moving through a soft solid. The greater the pitch, the greater the amount of thrust generated by the propeller blade, but the greater resistance encountered.

Additionally, referring now specifically to FIG. 5, the swash plate 120 may be configured to orient itself such that a first portion 121' of the linkage interfacing surface 121 is relatively closer to the hub 123 than a second portion 121". When in such an orientation, as the plurality of linkages 122 rotate, they will translate proximally as they approach the first portion 121' and translate distally as they approach the second portion 122". This, in turn, will cause the pitch of a blade 112 to increase as the linkage 122 corresponding thereto approaches the first portion 121' and decrease as the corresponding linkage 122 approaches the second portion 121". Accordingly, the pitch of the blade 112 will change as it rotates. Furthermore, because the thrust generated by the blade 112 is a function of its pitch, the amount of thrust generated by the blade 112 can change as it rotates, and the thrust generated by each blade 112 of the plurality of blades can differ at any given instant. Accordingly, whereas traditional propeller systems only enabled propeller blades to generate an equal thrust at a given instant, resulting in a total thrust vector of the propeller that is orthogonal to the plane of rotation of the propeller, the propeller system 110 of the present invention may generate a total thrust vector that is skew to the plane of rotation of the propeller system 110.

The orientation of the swash plate 120 may be controlled by a controller. The controller may be a computer that is operable to control a mechanism to change the orientation and/or longitudinal position of the swash plate 120 responsive to one or more inputs. The controller may further be operable to change the orientation of the control surfaces 152 responsive to one or more inputs. It is contemplated and included within the scope of the invention that the controller may be operable to change the orientation of the control surfaces 152 in conjunction with or independently of the orientation and/or longitudinal position of the swash plate 120 to utilize changing both the thrust vector generated by the propeller system 110 and the aerodynamic profile of the wings 150 to effectuate a desired change in the direction or travel, orientation, or other physical condition of the vehicle 100. Accordingly, the ability of the controller to control the orientation of the control surfaces 152 is contemplated and included within the scope of the invention and may be performed whenever the orientation and/or longitudinal position of the swash plate 120 is changed by the controller.

The vehicle 100 may further comprise a plurality of sensors. The plurality of sensors may generate data related to the physical status of the vehicle and transmit that data to the controller. Types of sensors that may be comprised by the plurality of sensors includes, but is not limited to, accelerometers, gyroscopes, vibration sensors, angular position sensors, video sensors, audio sensors, airspeed sensors, GPS sensors, compass sensors, altitude sensors, barometric pressure sensors, humidity sensors, temperature sensors, hydraulic pressure sensors, fuel level sensors, and the like. The sensors may be distributed throughout the vehicle and electrically connected to the controller so as to capture the data and transmit the data to the controller. The controller may be operable to change the orientation and/or longitudinal position of the swash plate 120, and hence change the thrust generated by the propeller system 110, responsive to data received from the plurality of sensors. Moreover, the controller may be operable to analyze the data received from the plurality of sensors to change the orientation and/or longitudinal position of the swash plate 120 to change the thrust vector generated by the propeller system 110 to correct for any changes to the trim of the vehicle 100.

The controller may further be operably coupled to and control the operation of the motor 116. Accordingly, the controller may be operable to concurrently control the operation of the motor 116 and the orientation and/or longitudinal position of the swash plate 120 to generate a desired thrust vector from the propeller system 110. In some embodiments, the controller may operate the motor 116 to generate sufficient power to turn the hub 123, and hence the plurality of blades 112, at a rate of 1,500 RPM, representing a maximum RPM of the propeller system 110. In some embodiments, the maximum RPM of the propeller system 110 may be 1,200 RPM. It is contemplated and included within the scope of the invention that the motor 116 may be operable to generate sufficient power to turn the hub 123 at any rate. Additionally, the controller may be operable to operate the propeller system 110 to generate sufficient thrust to enable vertical take-off and landing (VTOL) of the vehicle 100 without any lift being generated by the wings 150. The controller may further be operable to operate the propeller system 110 and the control surfaces 152 to transition the vehicle 100 from a vertical orientation to a horizontal orientation after take-off, and to transition the vehicle 100 from a horizontal orientation to a vertical orientation prior to landing. It is contemplated and included within the scope of the invention that the vehicle 100 may additionally operate as a conventional take-off and landing (CTOL), short take-off and landing (STOL), short take-off and vertical landing (STOVL) craft, and all other methods of take-off and landing as are known in the art.

The vehicle 100 may further comprise a communication device that is operable to receive control commands from a remote transmitter and transmit the control commands to the controller, which may further be configured to change the orientation and/or longitudinal position of the swash plate 120 responsive to the control commands. Such a remote transmitter may include a pilot on the ground transmitting control commands to change the direction of travel of the vehicle 100. In some embodiments, the control commands received from the remote transmitter may be commands to change the orientation and/or longitudinal position of the swash plate 120, and the controller may be operable to execute those commands. In some embodiments, the control commands received from the remote transmitted may be commands to one of effectuate a change in the direction of travel of the vehicle 100 and change the thrust generated by the propeller system 110, and the controller may be operable to interpret those commands and determine a desired change in the orientation and/or longitudinal position of the swash plate 120 and effectuate such a change.

In some embodiments, the controller may be configured to operate in the motor 116 and position and orient the swash plate 120 in a landing mode such that the motor 116 is operating at or near a maximum RPM and the pitch of the plurality of blades is approximately 0 degrees, unless otherwise indicated by one of the plurality of sensors and a control command. Such a mode of operation will enable maximum control of the vehicle 100 with minimal response time while generating little or no thrust, as is desirable during landing. Additionally, the controller may be configured to position and orient the swash plate 120 that may cause the propeller system 110 to generate thrust that may resist the forward motion of the vehicle. Such functionality may enable the vehicle 100 to move in a backwards motion when taxiing and, when landing in a conventional aircraft landing, to decelerate upon touching down.

While the vehicle 100 is a UAS, it is contemplated and included within the scope of the invention that the propeller system 110 may be included in a manned aircraft. In such embodiments, the controller may be configured to change the orientation and/or longitudinal position of the swash plate 120 responsive to a pilot's use of aircraft controls, including mechanical, hydro-mechanical, and fly-by-wire controls.

Figure 3:
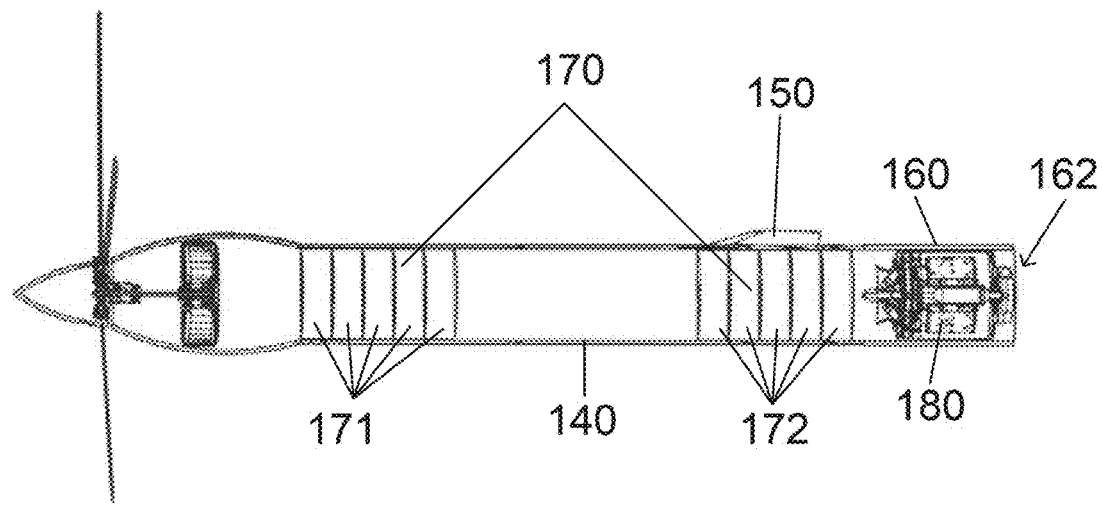
FIG. 3 is a sectional view of the vehicle of FIG. 2 taken along line A-A.

Referring now back to FIG. 3, additional elements of the vehicle 100 will be discussed in greater detail. The vehicle 100 may comprise one or more batteries 170. The batteries 170 may be operable to provide electrical power to the motor 116, the controller, and any other electrical componentry comprised by the vehicle 100. The batteries may be positioned within the fuselage 140. Additionally, the batteries 170 may be configured and positioned so as to evenly distribute their weight about a longitudinal axis of the vehicle 100. In the present embodiment, the vehicle 100 comprises a first array of batteries 171 positioned within a proximal portion of the fuselage 140 and a second array of batteries 172 positioned within a distal portion of the fuselage 140. The batteries 170 may be operable to deliver sufficient power to operate all electrical componentry comprised by the vehicle 100 simultaneously at their maximum capacity, i.e. their maximum power draw. In some embodiments, the vehicle 100 may comprise a port and electrical wiring that facilitate the charging of the batteries 170 by connection to an external power source.

In some embodiments, the vehicle 100 may further comprise a generator 180. The generator 180 may be electrically connected to the batteries 170 and may be operable to generate electrical power to provide that power to and recharge the batteries 170 while the vehicle 100 is in flight. The generator 180 may be any type of generator as is known in the industry, including gas turbine generators. The controller may be operable to selectively operate the generator 180 to recharge the batteries 170 during flight. For example, the controller may be configured to determine if the batteries 170 reach a lower charge threshold and may operate the generator 180 to recharge the batteries 170 until an upper charge threshold is reached.

The generator 180 may be positioned in fluidic communication with fuel comprised by a fuel reservoir of the vehicle 100. The fuel reservoir may contain the fuel prior to being conveyed to the generator 180. Furthermore, the fuel reservoir may be positioned and configured to minimize the change to the center of gravity of the vehicle as fuel is conveyed from the fuel reservoir to the generator 180. In the present embodiment, the fuel reservoir may be comprised by the wings 150, and the vehicle 100 may comprise fuel pumps and tubing to effectuate the conveyance of fuel from the fuel reservoir to the generator 180. In the present embodiment, the generator 180 may be positioned in the rear section 160. The rear section 160 may comprise a vent 162 that facilitates the venting of exhaust produced by the operation of the generator 180.

In some embodiments, the vehicle 100 may be configured to facilitate the attachment and detachment of the wings 150. Such attachment and detachment may enable the usage of wings with differing aerodynamic profiles tailored to different use cases. For example, a first set of wings may have an aerodynamic profile optimized for operating at low speeds to reduce energy consumption, extending the flight time of the vehicle 100 before having to land, a second set of wings may have an aerodynamic profile optimized for operating at high speeds, increasing the maneuverability of the vehicle at relatively higher speeds, and a third set of wings may be optimized for a balance of maneuverability and energy efficiency. Furthermore, the wings 150 may be attached to the fuselage 140 so as to minimize or eliminate a change in the center of gravity of the vehicle 100 as a result of their attachment. Accordingly, in some embodiments, the wings 150 may be attached to the fuselage 140 at or adjacent to the center of gravity of the vehicle 100.

While the present embodiment provides a single propeller, it is contemplated and included within the scope of the invention a system comprising two or more counter-rotating propellers, in some embodiments the counter-rotating propellers may be coaxially aligned. Such an embodiment would mitigate and/or eliminate the induced rotation of the vehicle due to the torque generated by the single-direction rotation of a single propeller system by generating offsetting torque rotations from each of the counter-rotating propellers. Furthermore, it is contemplated and included within the scope of the invention that a vehicle could comprise multiple propellers with the thrust vectoring capabilities described hereinabove, with one or more of the propellers being offset from the longitudinal axis of the vehicle.

Alternative embodiments of the propeller system described hereinabove may effectuate a change in the pitch of the propeller blades by utilizing a plurality of stepper motors. The plurality of stepper motors may each be individually associated with a blade of the propeller. Actuation of the stepper motor may result in changing the pitch of the associated propeller blade. Such an embodiment has the advantage of total independence of each propeller blade from every other propeller blade.

Referring now to FIGS. 6-9, a propeller system 600 according to an embodiment of the invention is presented. The propeller system 600 may be operable to independently change the pitch of a plurality of blades 690 comprised by the propeller system 600 as the blades 690 rotate around a rotation axis 611 of a hub 610 also comprised by the propeller system 600.

The propeller system may further comprise a plurality of blade attachment apparatuses 660. The number of blade attachment apparatuses may be equal in number to the number of blades comprised by the plurality of blades 690. The plurality of blade attachment apparatuses 660 may be operable to attach an associated blade of the plurality of blades 690 to the hub 610, such that each blade of the plurality of blades 690 has an associated blade attachment apparatus of the plurality of blade attachment apparatuses 660 for attachment to the hub 610. While in the present embodiment the plurality of blades 690 comprises two blades 690', 690" and the plurality of blade attachment apparatuses comprises two blade attachment apparatuses 660', 660", any number of each is contemplated and included within the scope of the invention.

As mentioned above, the plurality of blade attachment apparatuses 660 may be configured to facilitate the rotation of blades 690', 690" attached thereto as the blade 690' 690" (and, by extension, the blade attachment apparatus 660', 660") rotates about the hub rotation axis 611. Such rotation by the blade 690' 690" may be about a blade rotation axis 661. In some embodiments, the blade rotation axis 661 may be at least one of parallel with and colinear with a longitudinal axis of the blade 690', 690". In some embodiments, the blade rotation axis 661 may be orthogonal to the rotation axis 611 of the hub 610.

The propeller system 600 may comprise one or more hub housing members. In the present embodiment, the propeller system 600 comprises a proximal hub housing member 612 and a distal hub housing member 613. The proximal hub housing member 612 may be positioned towards a proximal end of the propeller system 600 and the distal hub housing member 613 may be positioned towards a distal end of the propeller system 600. Each of the proximal and distal hub housing members 612, 613 may be configured to at least partially enclose other elements of the propeller system 600. Furthermore, each of the proximal and distal hub housing members 612, 613 may be configured to permit attachment thereto of other elements of the propeller system 600.

Figure 9:
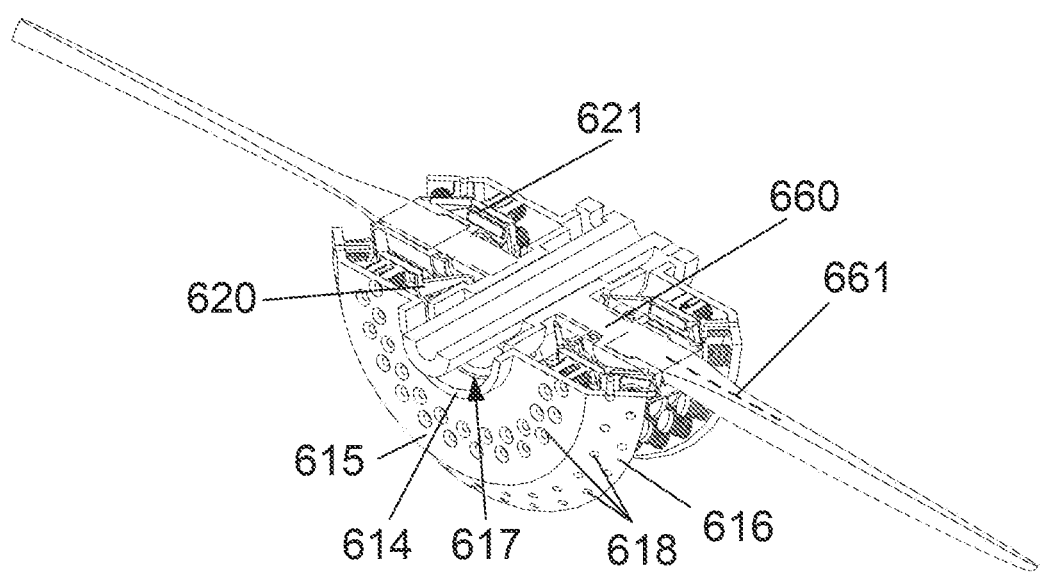
FIG. 9 is a perspective sectional view of the propeller system of FIG. 6.

Referring now to FIG. 9, features of the proximal and distal hub housing members 612, 613 will be discussed in detail. Each of the proximal and distal hub housing members 612, 613 may comprise a center wall 614, an intermediate section 615, and an outer section 616. The center wall 614 may be generally annular and define a center aperture 617 of the proximal and distal hub housing members 612, 613. The center aperture 617 may permit the placement therein of another element of the propeller system 600, as will be discussed hereinbelow. Additionally, the center wall may extend generally along a longitudinal direction of the propeller system, i.e. have a proximal end and a distal end. The intermediate section 615 may be positioned generally outward of the center wall 614 and may be one of integrally formed therewith and fixedly attached thereto. As in the present embodiment, where the proximal and distal hub housing members 612, 613 have a generally circular geometric configuration, the intermediate section 615 may extend radially outward from the center wall 614. Additionally, the intermediate section 615 may be concentric with the center wall 614. Furthermore, the intermediate section 615 may define a plane that is generally orthogonal to the direction of extension of the center wall 614. The outer section 616 may be positioned generally outward of and extend radially outward from the intermediate section 615 and may be one of integrally formed therewith and fixedly attached thereto. Additionally, the outer section 616 may be concentric with each of the intermediate section 615 and the center wall 614. The outer section 616 may be generally skew to the plane defined by the intermediate section 615.

Figure 7:
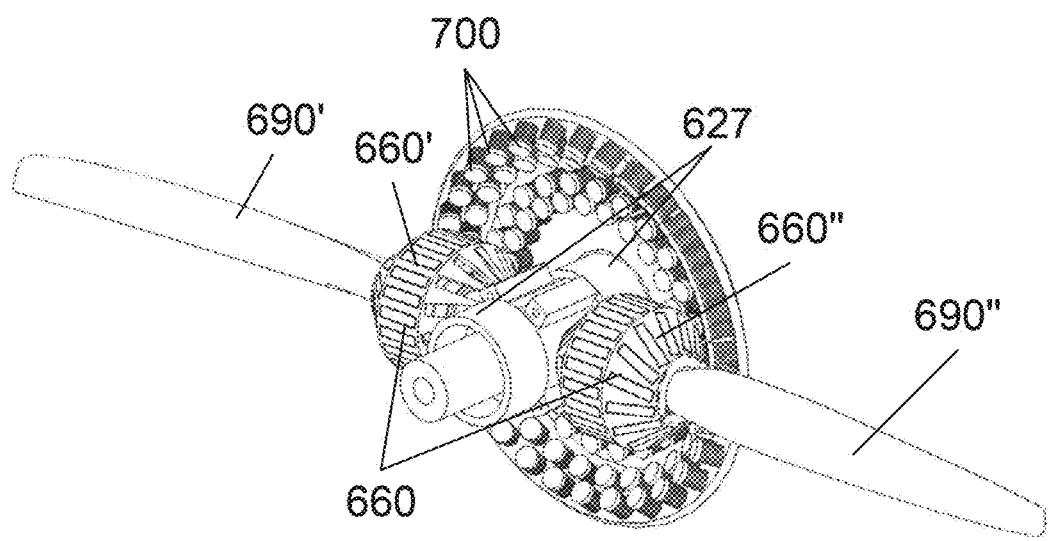
FIG. 7 is a perspective view of the propeller system of FIG. 6 with a proximal hub housing and an actuation section of a distal hub member removed.

Referring now additionally to FIG. 7, the propeller system 600 may comprise a plurality of electromagnets 700. The proximal and distal hub housing members 612, 613 may be configured to facilitate the positioning thereon and/or the attachment thereto of one or more electromagnets of the plurality of electromagnets 700. In some embodiments, at least one of the intermediate section 615 and the outer section 616 may be configured to facilitate the positioning thereon and/or the attachment thereto of one or more electromagnets of the plurality of electromagnets 700. In the present embodiment, each of the intermediate section 615 and the outer section 616 may be configured to facilitate the attachment of one or more electromagnets of the plurality of electromagnets 700. More specifically, the intermediate section 615 of the proximal hub housing member 612 may define a first magnet attachment section, the outer section 616 of the proximal hub housing member 612 may define a second magnet attachment section, the intermediate section 615 if the distal hub housing member 613 may define a third magnet attachment section, and the outer section 616 of the distal hub housing member 613 may define a fourth magnet attachment section. One or more electromagnets of the plurality of electromagnets 700 may be attached to the first, second, third, and fourth magnet attachment sections. More specifically, a first subset of electromagnets of the plurality of electromagnets 700 may be attached to the first magnet attachment section, a second subset of electromagnets of the plurality of electromagnets 700 may be attached to the second magnet attachment section, a third subset of electromagnets of the plurality of electromagnets 700 may be attached to the third magnet attachment section, and a fourth subset of electromagnets of the plurality of electromagnets 700 may be attached to the fourth magnet attachment section.

The electromagnets comprised by the plurality of electromagnets 700 may be any device operable to generate a magnetic field as a result of current being delivered thereto. Types of electromagnets include, but are not limited to, devices having a cylindrical ferromagnetic core with a coil of conductor wrapped there around, and a device as described in U.S. Patent Application Publication No. 2015/0245548 titled Control of Electric Field Effects in a Printed Circuit Board Assembly using Embedded Nickel-Metal Composite Materials published Aug. 27, 2015, the content of which is incorporated herein by reference except to the extent disclosure therein is inconsistent with disclosure herein.

Furthermore, the proximal and distal hub housings 612, 613 may comprise a plurality of vias 618. The vias 618 may be configured to at least one of facilitate attachment of an electromagnet of the plurality of electromagnets 700 to the proximal or distal hub housing members 612, 613 and facilitate establishing electrical communication with an electromagnet of the plurality of electromagnets 700 permitting one or more electrical conductors, such as wires, to pass therethrough.

Figure 8:
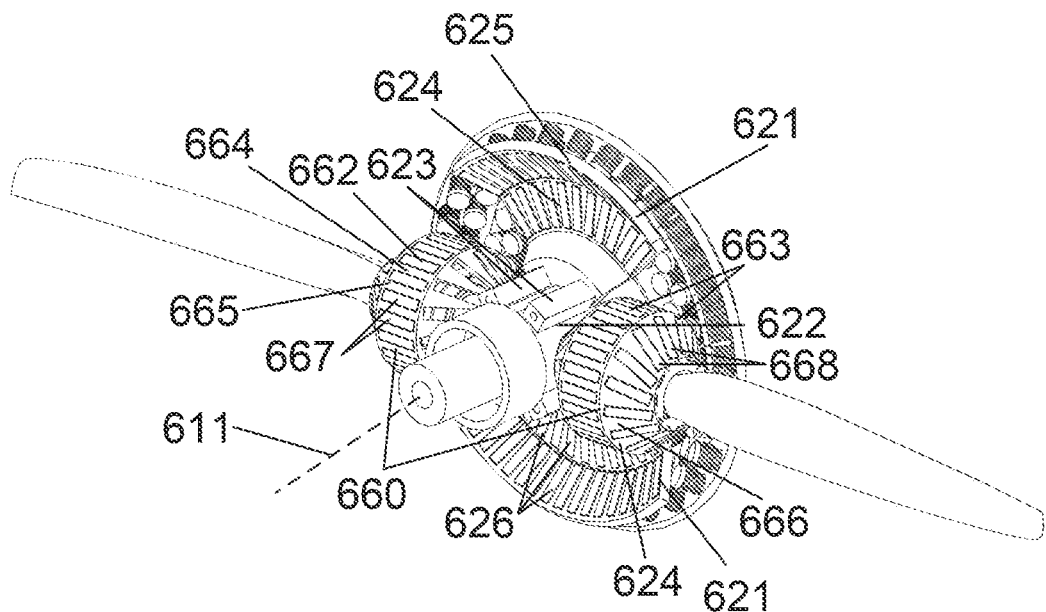
FIG. 8 is a perspective view of the propeller system of FIG. 6 with a proximal hub housing removed.

Referring now specifically to FIGS. 7, 8, and 9, additional elements of the hub 610 will be discussed. The hub 610 may further comprise a proximal hub actuation member 620 and a distal hub actuation member 621. The proximal and distal hub actuation members 620, 621 may by attached to and/or integrally formed with a center hub member 622. In the present embodiment, the center hub member 622 may comprise one or more actuation member attachment sections 623 to facilitate the attachment of the proximal and distal hub actuation members 620, 621. Additionally, the hub 610 may further comprise one or more cuffs 627. The cuffs 627 may be positioned to cooperate with one or more of the actuation member attachment sections 623 to define a gap therebetween within which one of the proximal and distal hub actuation members 620, 621 may be positioned. In some embodiments, the cuffs 627 may further be configured to facilitate the attachment of one of the proximal and distal hub actuation members 620, 621 to the center hub member 622.

Furthermore, the plurality of blade attachment apparatuses 660 may be attached to the center hub member 622. The center hub member 622 may be configured to be rotated about the rotational axis 611. Rotation of the center hub member 622 about the rotational axis 611 may result in the rotation of the plurality of blade attachment apparatuses 660. Such rotation may be effectuated by rotation of the proximal and distal hub actuation members 620, 621. Accordingly, actuation of the proximal and distal hub actuation members 620, 621 may result in the rotation of the plurality of blade attachment apparatuses 660, and concordantly the plurality of blades 690. Actuation of the proximal and distal hub actuation members 620, 621 may be accomplished by the selective operation of the plurality of electromagnets 700 to selectively pull and/repulse the proximal and distal hub actuation members 620, 621 as they rotate about the rotation axis 611. More specifically, a given electromagnet of the plurality of electromagnets 700 may generate a magnetic field operable to attract an approaching hub actuation member if acceleration and/or maintaining the present rotational velocity of the hub actuation member is desired or generate a magnetic field operable to repulse an approaching hub actuation member if deceleration of the hub actuation member is desired. Conversely, a given electromagnet of the plurality of electromagnets 700 may generate a magnetic field operable to repulse a retreating hub actuation member if acceleration and/or maintaining the present rotational velocity of the hub actuation member is desired or generate a magnetic field operable to attract a retreating hub actuation member if deceleration of the hub actuation member is desired. Accordingly, each of the proximal and distal hub actuation members 620, 621 may comprise and/or be formed from one or more materials that are magnetic, i.e. are attracted and/or repelled in the presence of a magnetic field. Accordingly, each of the proximal and distal hub actuation members 620, 621 may comprise and/or be formed of at least one of paramagnetic materials, ferromagnetic materials, and any other magnetic material known in the art.

Each of the proximal and distal hub actuation members 620, 621 may comprise a first actuation section 624 and a second actuation section 625. The first and second actuation sections may be configured to be positioned generally adjacent subsets of the plurality of electromagnets 700. More specifically, the first actuation section 624 of the proximal hub actuation member 620 may be configured to be positioned adjacent the first subset of electromagnets of the plurality of electromagnets 700, the second actuation section 625 of the proximal hub actuation member 620 may be configured to be positioned adjacent the second subset of electromagnets of the plurality of electromagnets 700, the first actuation section 624 of the distal hub actuation member 621 may be configured to be positioned adjacent the third subset of electromagnets of the plurality of electromagnets 700, and the second actuation section 625 of the distal hub actuation member 621 may be configured to be positioned adjacent the fourth subset of electromagnets of the plurality of electromagnets 700. Accordingly, each of the first and second actuations sections 624, 625 of the proximal and distal hub actuation members 620, 621 may be most significantly actuated by operation of the subset of the plurality of electromagnets 700 it is positioned adjacent to.

The proximal and distal hub actuation members 620, 621 may further comprise a plurality of voids 626. The plurality of voids 626 may be interspersed throughout the proximal and distal hub actuation members 620, 621 so as to reduce the mass, and therefore the inertia, of the proximal and distal hub actuation members 620, 621, facilitating their actuation with the usage of less energy.

In the present embodiment, each of the proximal and distal hub actuation members 620, 621 comprise two structures positioned on opposite sides of the center hub member 622, each structure comprising first and second actuation sections 624, 625 as described hereinabove. It is contemplated and included within the scope of the invention that the proximal and distal hub actuation members 620, 621 may comprise any number of such structures positioned in any spacing about the center hub member 622.

Additionally, it is contemplated and included within the scope of the invention that some embodiments of the proximal and distal hub actuation members 620, 621 may comprise only the first actuation section 624 and omit the second actuation section 625.

As described for the embodiment depicted in FIGS. 1-5, the propeller system 600 may further comprise a controller. The controller may be operable to individually operate each electromagnet of the plurality of electromagnets 700. To enable operation, the propeller system 600 may further comprise an electrical power source operable to deliver electrical power to each of the controller and the plurality of electromagnets 700 to enable the operation of the plurality of electromagnets 700, i.e. enable usage of electricity to generate a magnetic field by each electromagnet of the plurality of electromagnets 700.

As mentioned above, each apparatus of the plurality of blade attachment apparatuses 660 may be attached to the center hub member 622. Such attachment may permit each apparatus of the plurality of blade attachment apparatuses 660 to rotate about the blade rotation axis 661 independent of the movement of the center hub member 622. Furthermore, such attachment may permit each apparatus of the plurality of blade attachment apparatuses 660 to rotate about a blade rotation axis 661 thereof independent of the rotation of another apparatus of the plurality of blade attachment apparatuses.

Additionally, each apparatus of the plurality of blade attachment apparatuses 660 may comprise a magnet 662. The magnet 662 may be attached to a body structure 664 of the blade attachment apparatus configured to facilitate the rotation of the apparatus of the plurality of blade attachment apparatuses 660 to which it is attached about the blade rotation apparatus 660. In some embodiments, the magnet 662 may be a permanent magnet. In some embodiments, each apparatus of the plurality of blade attachment apparatuses 660 may comprise a plurality of permanent magnets 663. The plurality of permanent magnets 663 may be positioned on the body structure 664 so as to be adjacent the plurality of electromagnets 700 at some point as the blade attachment apparatus rotates. Moreover, the plurality of permanent magnets 663 may be configured to be attracted to/repelled by magnetic fields generated by the plurality of electromagnets 700, thereby imparting rotation to the body structure 664, the blade attachment apparatus, and the blade attached to the blade attachment apparatus. Accordingly, the aforementioned controller may control the rotation and/or angular position of the plurality of blades 690 through selective operation of the plurality of electromagnets 700 to interact with the plurality of permanent magnets 663.

The body structure 664 may comprise a first magnet attachment section 665 and a second magnet attachment section 666. The plurality of permanent magnets 663 may comprise a first subset of magnets 667 attached to the first magnet attachment section 665 and a second subset of magnets 668 attached to the second magnet attachment section 666. As the body structure 664 rotates, the first subset of magnets 667 may temporarily be positioned adjacent one of the first and third subsets of the plurality of electromagnets 700 and the second subset of magnets 668 may be temporarily positioned adjacent one of the second and fourth subsets of the plurality of electromagnets 700. Accordingly, the plurality of electromagnets 700 may be selectively operated to generate a magnetic field operable to interact with the plurality of permanent magnets 663 that are adjacent thereto at any given moment to effectuate rotation of the body structure 664 and the blade attached thereto.

Figure 10:
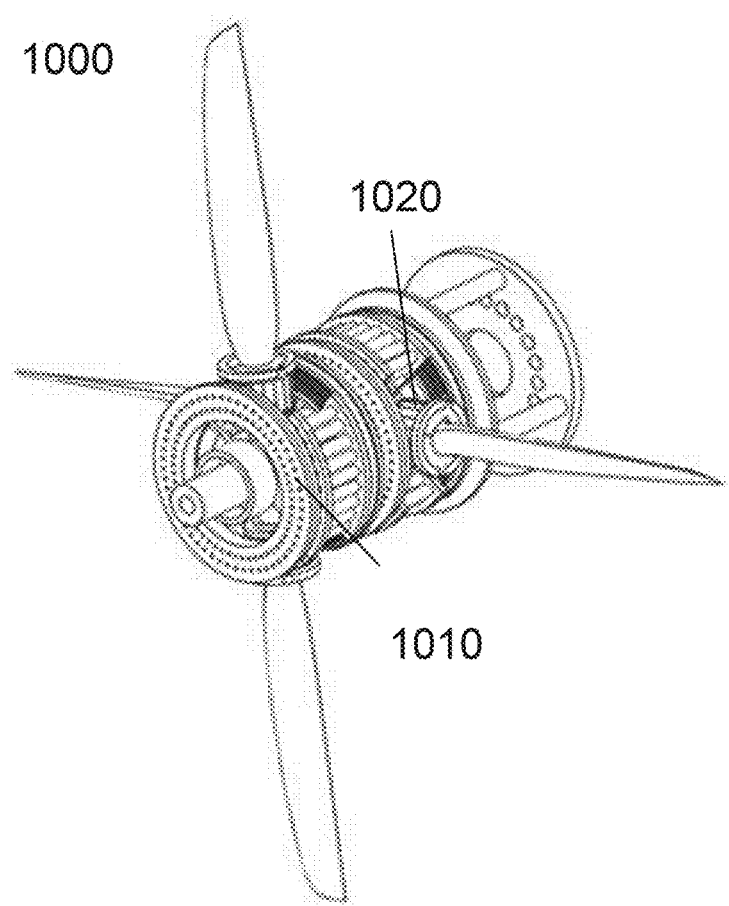
FIG. 10 is a perspective view of a plurality of propeller systems of FIG. 6 positioned in axial alignment with each other.
Figure 11:
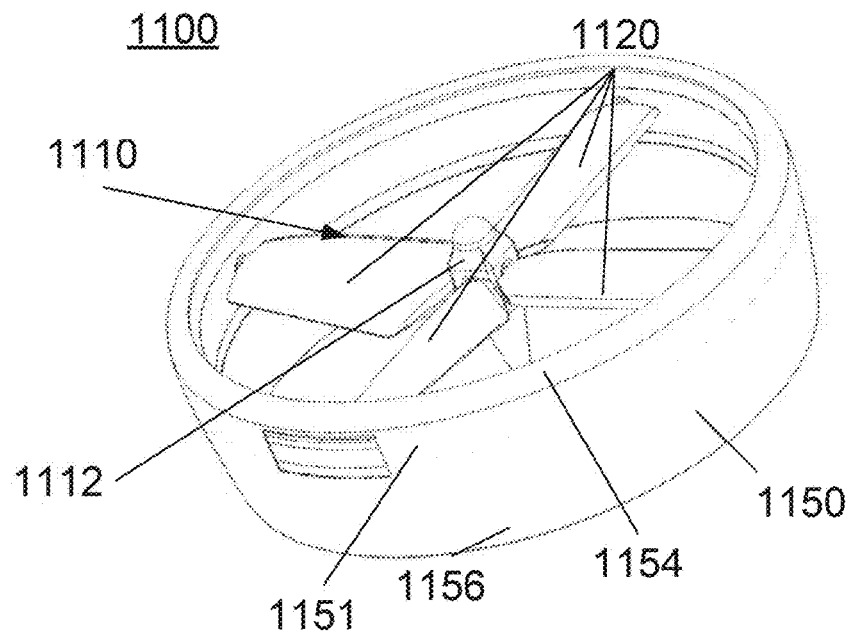
FIG. 11 is a perspective view of a propeller system according to an embodiment of the invention.
Figure 12:
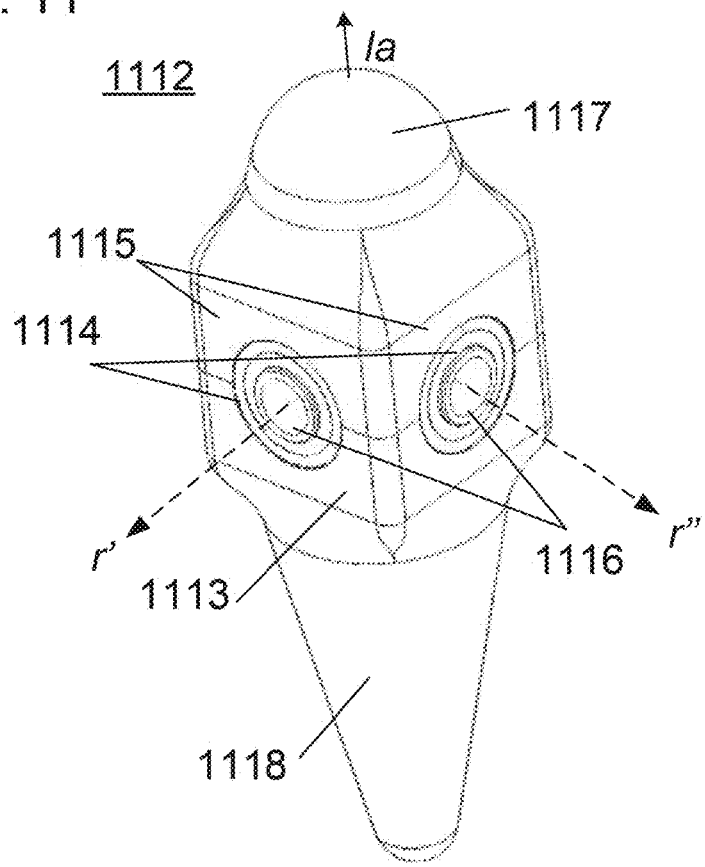
FIG. 12 is a perspective view of a central attachment member of the propeller system of FIG. 11.
Figure 13:
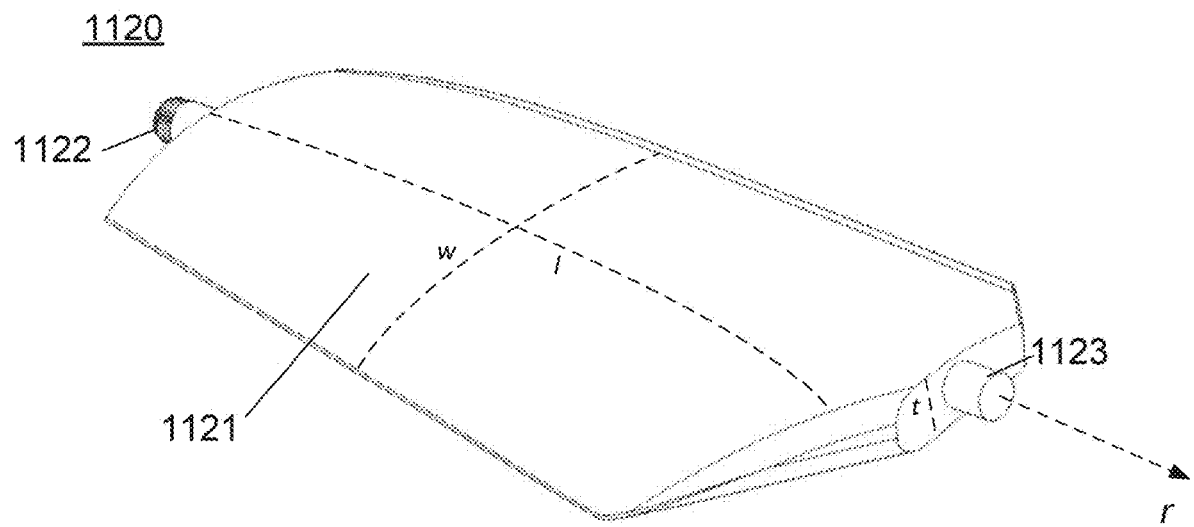
FIG. 13 is a perspective view of a blade apparatus of the propeller system of FIG. 11.
Figure 14:
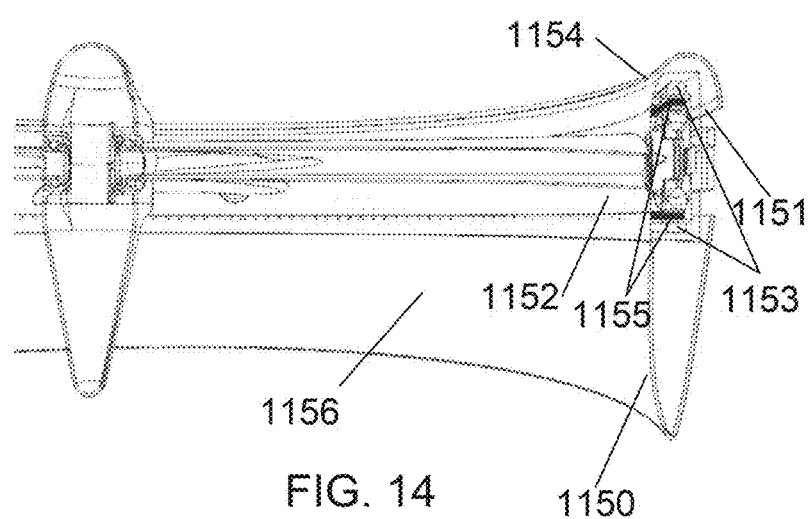
FIG. 14 is a partial sectional view of the propeller system of FIG. 11 taken along line B-B.
Figure 15:
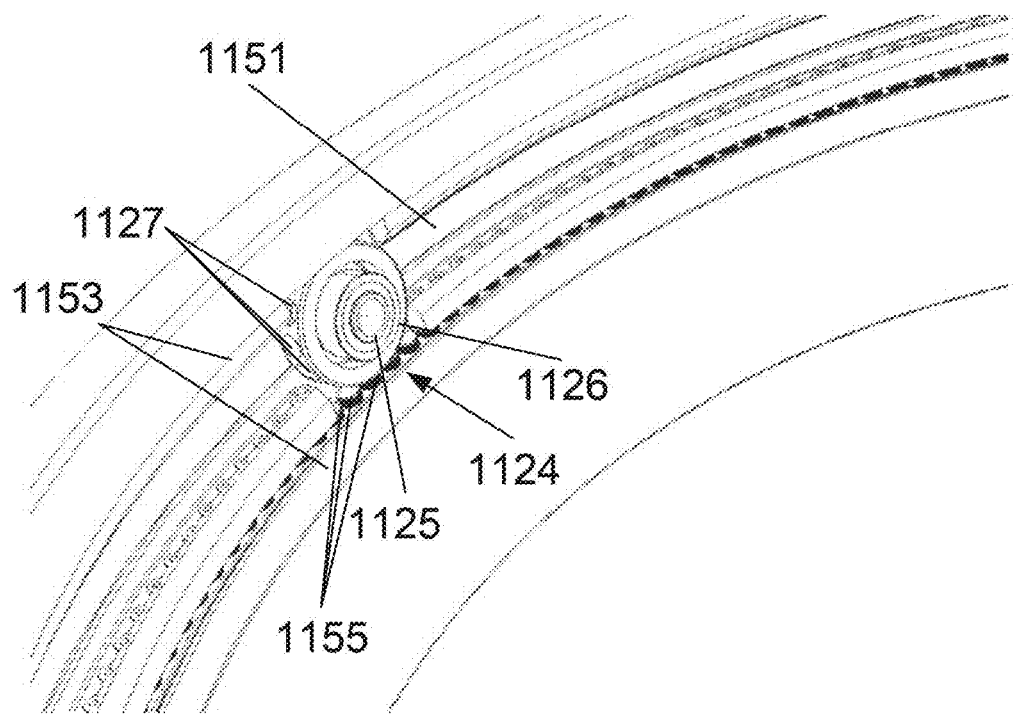
FIG. 15 is a perspective view of the propeller system of FIG. 11 with the plurality of blade bodies removed.
Figure 16:
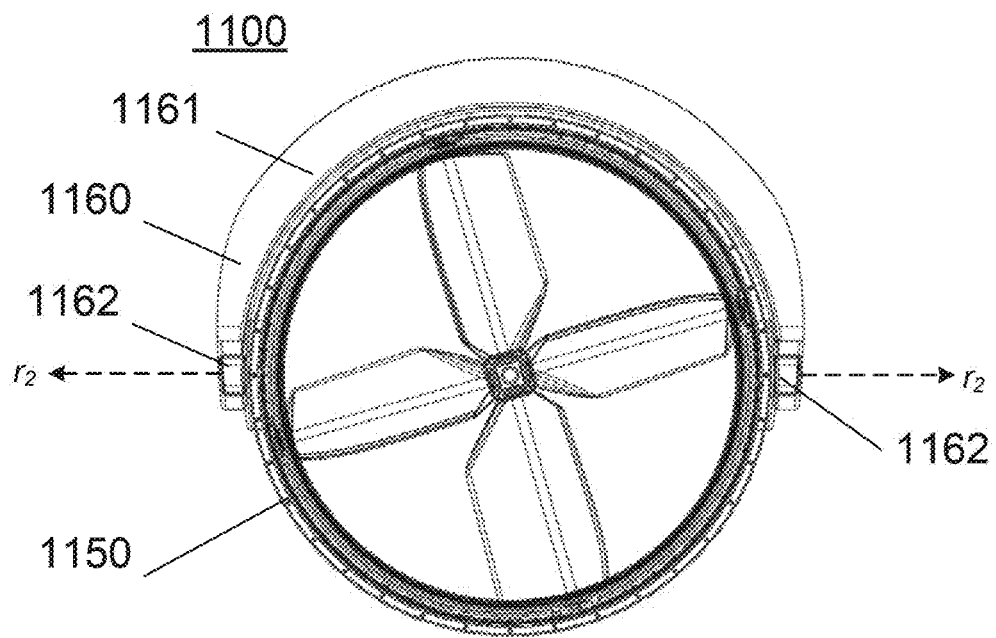
FIG. 16 is a top view of the propeller system of FIG. 11 with an attached mounting frame and an inlet cowling removed.

Referring now to FIG. 10, a system 1000 comprising two propeller systems 1010, 1020. The propeller systems 1010, 1020 may be consistent with the propeller system 600 depicted in FIGS. 6-9 and described herein above, or the propeller system 110 depicted in FIGS. 1-5 and described herein above. The propeller systems 1010, 1020 may be positioned such that their respective rotational axes of their respective hubs may be co-linear. Moreover, the propeller systems 1010, 1020 may be operable to be contra-rotating, that is, one may rotate clockwise while the other rotates counter-clockwise. Such a system 1000 advantageously reduces or eliminates a torque exerted by the system 1000 exerted on a vehicle to which the system 1000 is attached. Additionally, where the propeller systems 1010, 1020 are consistent with the propeller system 600, the system 1000 may provide the aforementioned advantages without requiring any additional weight due to additional gearing required by traditional contra-rotating propeller systems.

Referring now to FIGS. 11-17, a propeller system 1100 according to an embodiment of the invention is presented. The propeller system 1100 may comprise a propeller 1110 and a propeller frame 1150. The propeller 1110 may comprise a central attachment member 1112 and a plurality of blade apparatuses 1120.

The central attachment member 1112 may be configured to attach to and be carried by the plurality of blade apparatuses 1120. The concurrent attachment of the plurality of blade apparatuses 1120 to the central attachment member 1112 may facilitate the rotation of the plurality of blade apparatuses 1120. The central attachment member 1112 may comprise a plurality of blade attachment apparatuses 1114 configured to attach to the plurality of blade apparatuses 1120. The central attachment member 1112 may comprise a body member 1113 and a plurality of blade attachment apparatuses 1114 positioned within the body member 1113 equal in number to the number of blade apparatuses 1120 such that each blade attachment apparatus 1114 may be paired with a blade apparatus 1120. In the present embodiment the central attachment member 1112 comprise four blade attachment apparatuses 1114. The body member 1113 may define a plurality of faces 1115, with each blade attachment apparatus 1114 being positioned on one of the plurality of faces 1115. Furthermore, the weight of the central attachment member 1112 may be minimized to reduce rotational inertia. Specifically, the central attachment member 1112 may be formed of one or more materials that, on average, have a density of less than five grams per cubic centimeter.

The plurality of blade attachment apparatuses 1114 may be configured to permit the plurality of blade apparatuses 1120 to rotate about a radial axis r of the propeller system 1100 when attached. Each blade attachment apparatus 1114 may define respective radial axes r', r", etc. Each radial axis r may be a ray with a common initial point. Such attachment may be accomplished using any means or method known in the art, including, but not limited to, bearings, magnetic attachment, and the like. In the present embodiment, the blade attachment apparatuses 1114 may comprise an attachment bearing 1116 configured to be attached to the blade apparatuses 1120 and configured to facilitate rotation thereof about rotational axis r. Attachment to the plurality of blade apparatuses 1120 may result in the central attachment member 1112 being carried thereby. Moreover, rotational translation of the plurality of blade apparatuses 1120 may cause the central attachment member 1112 to rotate about a longitudinal axis la thereof.

Additionally, the central attachment member 1112 may comprise a head 1117 and a tail 1118. The head 1117 may be a hemispheroid and positioned on a proximal end of the central attachment member 1112, attached to a proximal end of the body member 1113. The tail 1118 may be conical with a rounded lower end and positioned on a distal end of the central attachment member 1112, attached to a distal end of the body member 1113.

Each blade apparatus 1120 may comprise a blade body 1121 and a magnetic coupling member 1124. The blade body 1121 may be configured to attach to the central attachment member 1112 such that the blade apparatus 1120 may rotate about the radial axis r independent of each of the central attachment member 1112 and each other blade apparatus of the plurality of blade apparatuses 1120. The blade body 1121 may have a ratio of a maximum blade width w between a leading edge of the blade body 1121 and a trailing edge of the blade body 1121 to a blade length l of the blade body 1121 within a range from 0.4 to 0.65. In some embodiments, the w/l ratio may be within a range from 0.54 to 0.56. Additionally, the blade body 1121 may have a ratio of a blade thickness t to the blade width w within a range from 0.15 to 0.22. In some embodiments, the t/w ration may be within a range from 0.18 to 0.19.

Each blade apparatus 1120 may comprise an inner attachment member 1123. The inner attachment member 1123 may be configured to interface with a blade attachment apparatus 1114 of the central attachment member 1112. In some embodiments, the inner attachment member 1123 may be configured to attach to the attachment bearing 1116 of the blade attachment apparatus 1114. Such attachment may permit the blade apparatus 1120 to rotate about rotational axis r independent of the central attachment member 1112. Furthermore, such independent rotation of the blade apparatus 1120 and the central attachment member 1112 may further enable each blade apparatus 1120 of the plurality thereof to rotate about respective rotational axes independent of the other blade apparatuses 1120. Attachment between the inner attachment member 1123 and the blade attachment apparatus 1114 may be accomplished by any means or method known in the art, including, but not limited to, welding, magnetic attachment, interference fit, adhesives, glues, and the like.

Each blade apparatus 1120 may comprise an outer attachment member 1122. The outer attachment member 1122 may extend radially outward from an end of the blade body 1121 opposite the inner attachment member 1123. The outer attachment member 1122 may be configured to attach to a magnetic coupling member 1124 comprised by the blade apparatus 1120. Such attachment between the outer attachment member 1122 and the magnetic coupling member 1124 may be fixed, such that rotation of the magnetic coupling member 1124 may rotate the outer attachment member 1122, and by extension the blade body 1121.

Each blade apparatus 1120 may comprise a magnetic coupling member 1124. The magnetic coupling member 1124 may be configured to be at least partially circumscribed by the propeller frame 1150. Additionally, the magnetic coupling member 1124 may be configured to be rotated about rotational axis r, such rotation resulting in rotating the blade body 1121. Additionally, the magnetic coupling member 1124 may further be configured to be translated laterally, i.e. around a ring defined by the propeller frame 1150. Such lateral movement of the magnetic coupling member 1124 may impart rotational motion of the blade body 1121 about longitudinal axis la.

Each magnetic coupling member 1124 may comprise an attachment section 1125 configured to attach to the outer attachment member 1122, a body member 1126, and a plurality of magnets 1127. The body member 1126 may be generally circular, defining a circular perimeter. The plurality of magnets 1127 may be seated within recesses in an exterior surface of the body member 1126. The plurality of magnets 1127 may be regularly spaced about the exterior surface of the body member 1126. Any number of magnets comprised by the plurality of magnets 1127 is contemplated and included within the scope of the invention. Moreover, the plurality of magnets 1127 may comprise permanent magnets, electromagnets, or both.

The propeller frame 1150 may be positioned to generally circumscribe the propeller 1110. The propeller frame 1150 may be configured to impart rotational and lateral movement to the magnetic coupling members 1124 comprised by the propeller 1110 rotate the propeller 1110 and generate vectored thrust as air or another fluidic medium moves through the propeller system 1100. In some embodiments, the propeller frame 1150 may have an outer diameter equal to or less than 36 inches.

The propeller frame 1150 may at least partially circumscribe the magnetic coupling members 1124 of the propeller 1110. Such partial circumscription may prevent the unintended detachment of the propeller 1110 from the propeller frame 1150. The propeller frame 1150 may comprise an inner wall 1152 configured to overlie a portion of the magnetic coupling members 1124 such that they may not translate radially inward. Moreover, the inner wall 1152 may comprise a plurality of cutouts configured to facilitate a portion of either the magnetic coupling member 1124 or the outer attachment member 1122 or the blade body 1121 to extend therethrough, enabling the attachment between the outer attachment member 1122 and the magnetic coupling member 1124. The propeller frame 1150 may further comprise an outer wall 1151. The outer wall 1151 may cooperate with the inner wall 1152 to partially circumscribe the magnetic coupling members 1124 by providing a radial outer limit to their translation.

The propeller frame 1150 may further comprise an electromagnet mounting member 1153 and a plurality of electromagnets 1155. The electromagnet mounting member 1153 may be attached to each of the outer and inner walls 1151, 1152 and provide a surface upon which the plurality of electromagnets 1155 may be mounted.

The propeller frame 1150 may further comprise an inlet cowling 1154 and an outlet cowling 1156. The inlet cowling 1154 may extend generally proximally from the propeller frame 1150 and the outlet cowling 1156 may extend generally distally from the propeller frame 1150. The inlet and outlet cowlings 1154, 1156 may enhance aerodynamic features of the propeller 1100 as is known in the art.

Additionally, the inner wall 1152 may be configured such that it defines a gap between itself and the plurality of blade apparatuses 1120. This gap, which may be defined as an airfoil gap, may cooperate with the inlet and outlet cowlings 1154, 1156 to create a ducted fan. The airfoil gap may contribute to the reduction of thrust loss at the outer ends of the blade bodies 1121. The airfoil gap may be minimized to ensure maximum thrust extraction.

As described hereinabove, the plurality of electromagnets 1155 may be operable to selectively generate magnetic fields to impart motion to the magnetic coupling members 1124, thereby rotating the propeller 1110 about longitudinal axis la and each blade body 1121 about respective rotational axes r. Specifically, the plurality of electromagnets 1155 may be configured to generate magnetic fields that interacts with the plurality of magnets 1127 of each magnetic coupling member 1124 to suspend the magnetic coupling members 1124, laterally translate the magnetic coupling members 1124, and rotate the magnetic coupling members 1124 about the rotational axes r.

The plurality of electromagnets 1155 may be attached to and carried by the electromagnet mounting member 1153. Such attachment may position the plurality of electromagnets 1155 adjacent to the magnetic coupling members 1124 as they rotate in and through the partially circumscribed space defined by the propeller frame 1150. In the present embodiment, the plurality of electromagnets 1155 comprises a first subset of electromagnets positioned to define a first annulus, the first annulus defining a plane that is offset from a rotational plane defined by the plurality of blade apparatuses 1120 in a first direction and a second subset of electromagnets positioned to define a second annulus, the second annulus defining a plane that is offset from the rotational plane defined by the plurality of blade apparatuses 1120 in a second direction opposite the first direction. For example, the first direction may be proximal and the second direction may be distal, such that the first subset of electromagnets is positioned towards a proximal end of the propeller system 1100 and the second subset of electromagnets is positioned towards a distal end of the propeller system 1100.

The propeller system 1100 may further comprise a mounting frame 1160. The mounting frame 1160 may be attached to the propeller frame 1150 and carry the propeller frame 1150, and further be configured to be attached to a vehicle, thereby attaching the propeller system 1100 to the vehicle. The mounting frame 1160 may comprise a body member 1161 and one or more coupling apparatuses 1162. In the present embodiment, the mounting frame comprises 1160 two coupling apparatuses 1162 attached at opposing ends of the body member 1161, the body member 1161 being generally arcuate and conforming to an outer shape of the propeller frame 1150. The coupling apparatuses 1162 may be configured to attach to the propeller frame 1150 such that the propeller frame 1150 may rotate independently of the mounting frame 1160, thereby rotationally coupling the propeller frame 1150 to the mounting frame 1160. In the present embodiment, the coupling apparatuses 1162 may define a rotational axis $r_2$ about which the propeller frame 1150 may rotate. In some embodiments, the coupling apparatuses 1162 may be configured to be positioned in a locked configuration, thereby locking the propeller frame 1150 in a present rotational orientation and preventing the propeller frame 1150 from rotating about rotational axis $r_2$, and positioned in an unlocked configuration, thereby unlocking the propeller frame 1150 and permitting the propeller frame 1150 to rotate about rotational axis $r_2$.

Figure 17:
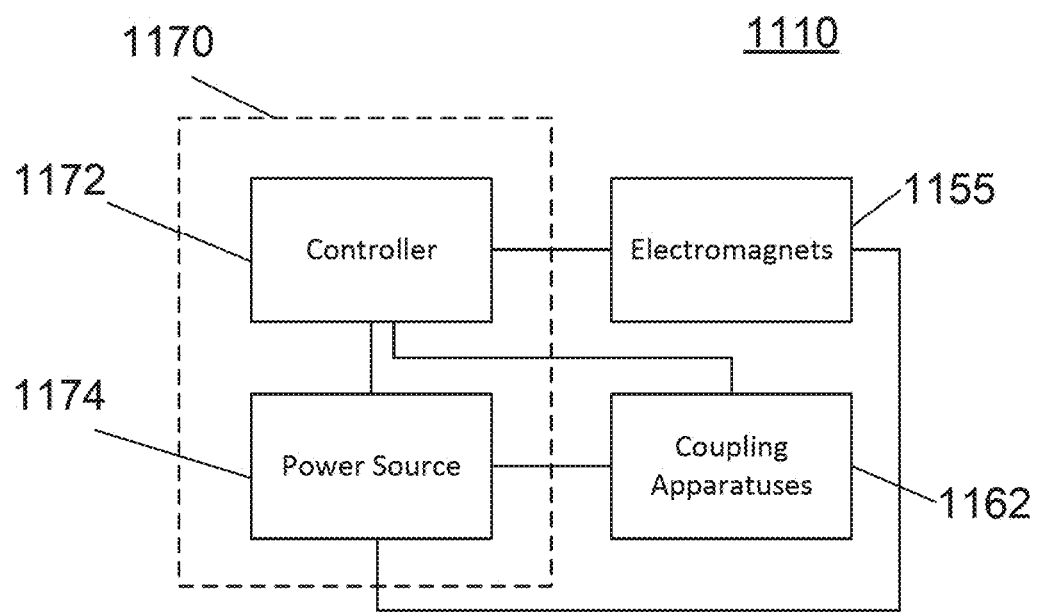
FIG. 17 is a schematic view representing a control system of the propeller system of FIG. 11.

Referring now specifically to FIG. 17, a control system 1170 of the propeller system 1100 will be discussed in greater detail. The control system 1170 may comprise a controller 1172 and a power source 1174. The controller 1172 may be coupled to and powered by the power source 1174 and may be operably coupled to each of the plurality of electromagnets 1155 and the coupling apparatuses 1162. Similarly, the power source 1174 may be coupled to the plurality of electromagnets 115 and the coupling apparatuses 1162. Although a single power source is shown, it is contemplated and included within the scope of the invention that the power source 1174 may comprise any number of sources of electrical power necessary to provide electricity of sufficient voltage, current, and waveform to enable the operation of the controller 1172, the plurality of electromagnets 1155, and the coupling apparatuses 1162.

The controller 1172 may be operable to control the operation of each electromagnet of the plurality of electromagnets 1155. Specifically, the controller 1172 may operate the plurality of electromagnets 1155 to generate magnetic fields that will interact with the magnetic fields of the permanent magnets of the magnetic coupling members 1124 to impart the lateral and rotational movement of the magnetic coupling members 1124 as described hereinabove. Accordingly, the controller 1172 may be configured to operate the plurality of electromagnets 1155 to generate magnetic fields of varying magnitude and/or polarity. Similarly, the controller 1172 may be configured to operate the coupling apparatuses 1162, transitioning them between locked and unlocked configurations, thereby selectively preventing or permitting the propeller frame 1150 from rotating about rotational axis $r_2$.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A propeller system comprising:
   a propeller comprising:
      a central attachment member positioned at a rotational axis of the propeller; and
      a plurality of blade apparatuses, each blade apparatus of the plurality of blade apparatuses comprising:

a blade body attached to the central attachment member such that each blade apparatus of the plurality of blade apparatuses may rotate about a radial axis of the propeller system independent of both the central attachment member and each other blade apparatus of the plurality of blade apparatuses; and a magnetic coupling member attached to a radially outward end of the blade body such that rotation of the magnetic coupling member along the radial axis of the propeller system may similarly rotate the blade body and lateral movement of the magnetic coupling member causes the blade body to rotate about the rotational axis of the propeller;

a propeller frame configured to at least partially circumscribe the magnetic coupling member of each blade apparatus and defining an aperture within which each of the central attachment member and the plurality of blade apparatuses are positioned; and a plurality of electromagnets positioned on the propeller frame and operable to generate magnetic fields to suspend the magnetic coupling members, laterally translate the magnetic coupling members, and rotate the magnetic coupling members along the radial axis of the propeller system.

2. The propeller system of claim 1 wherein a ratio of a maximum blade width between a leading edge of the blade body and a trailing edge of the blade body to a blade length of the blade body is within a range from 0.4 to 0.65.

3. The propeller system of claim 2 wherein the ratio between the maximum blade width to the blade length is within a range from 0.54 to 0.56.

4. The propeller system of claim 1 wherein a ratio of a maximum blade thickness and a maximum blade width between a leading edge of the blade body and a trailing edge of the blade body is within a range from 0.15 to 0.22.

5. The propeller system of claim 4 wherein the ratio of the maximum blade thickness and the maximum blade width is within a range from 0.18 to 0.19.

6. The propeller system of claim 1 wherein the plurality of electromagnets comprises:
  a first subset of electromagnets positioned to define a first annulus that defines a plane that is offset from a rotational plane defined by the plurality of blade apparatuses in a first direction; and
  a second subset of electromagnets positioned to define a second annulus that defines a plane that is offset from the rotational plane defined by the plurality of blade apparatuses in a second direction that is opposite the first direction.

7. The propeller system of claim 1 further comprising a mounting frame rotationally coupled to the propeller frame.

8. The propeller system of claim 1 further comprising:
  an inlet cowling attached to and extending proximally from the propeller frame; and
  an outlet cowling attached to and extending distally from the propeller frame.

9. The propeller system of claim 1 wherein the propeller frame has an outer diameter equal to or less than 36 inches.

10. The propeller system of claim 9 further comprising an inner wall positioned intermediate the plurality of electromagnets and the blade body of the plurality of blade apparatuses such that an airfoil gap is defined between the radially outward end of the blade body of each blade apparatus of the plurality of blade apparatuses and the inner wall.

11. The propeller system of claim 1 wherein the central attachment member is formed of a material having a density of less than five grams per cubic centimeter.

12. The propeller system of claim 1 further comprising:
  a power source coupled to the plurality of electromagnets and configured to provide power to the plurality of electromagnets for generation of magnetic fields thereby; and
  a controller coupled to the power source and configured to control operation of the plurality of electromagnets;
  wherein the magnetic coupling members are configured to be oriented in one of a plurality of rotational orientations; and
  wherein the controller is configured to operate the plurality of electromagnets to generate magnetic fields operable to rotate the magnetic coupling members between rotational orientations.

13. The propeller system of claim 12 wherein the controller is configured to operate the plurality of electromagnets to generate magnetic fields to rotate the magnetic coupling members between rotational orientations as the propeller rotates such that an effective rotational orientation of magnetic coupling members over the course of at least a partial rotation of the propeller is between two rotational orientations.

14. The propeller system of claim 1 wherein the magnetic coupling member comprises:
  a body member comprising a circular perimeter;
  a plurality of recesses formed in an exterior surface about the perimeter of the body member; and
  a plurality of permanent magnets, each permanent magnet being positioned and retained within a recess of the plurality of recesses.

15. A propeller system comprising:
  a propeller comprising:
    a central attachment member positioned at a rotational axis of the propeller; and
    a plurality of blade apparatuses, each blade apparatus of the plurality of blade apparatuses comprising:
      a blade body attached to the central attachment member such that each blade apparatus may rotate about a radial axis of the propeller system independent of both the central attachment member and each other blade apparatus of the plurality of blade apparatuses; and
      a magnetic coupling member attached to a radially outward end of the blade body such that rotation of the magnetic coupling member along the radial axis of the propeller system may similarly rotate the blade body and lateral movement of the magnetic coupling member causes the blade body to rotate about the rotational axis of the propeller;
  a propeller frame configured to at least partially circumscribe the magnetic coupling member of each blade apparatus of the plurality of blade apparatuses and defining an aperture within which each of the central attachment member and the plurality of blade apparatuses are positioned;
  an inner wall positioned intermediate the plurality of electromagnets and the blade body of the plurality of blade apparatuses such that an airfoil gap is defined between the radially outward end of the blade body of each blade apparatus and the inner wall;
  an inlet cowling attached to and extending proximally from the propeller frame;
  an outlet cowling attached to and extending distally from the propeller frame;

a plurality of electromagnets positioned on the propeller frame and operable to generate magnetic fields to suspend the magnetic coupling members, laterally translate the magnetic coupling members, rotate the magnetic coupling members along the radial axis of the propeller system;

a power source coupled to the plurality of electromagnets and configured to provide power to the plurality of electromagnets for generation of magnetic fields thereby; and a controller coupled to the power source and configured to control operation of the plurality of electromagnets.

16. The propeller system of claim 15 wherein the plurality of electromagnets comprises:

a first subset of electromagnets positioned to define a first annulus that defines a plane that is offset from a rotational plane defined by the plurality of blade apparatuses in a first direction; and a second subset of electromagnets positioned to define a second annulus that defines a plane that is offset from the rotational plane defined by the plurality of blade apparatuses in a second direction that is opposite the first direction.

17. The propeller system of claim 16 wherein:

the magnetic coupling members are configured to be oriented in one of a plurality of rotational orientations;

the controller is configured to operate the plurality of electromagnets to generate magnetic fields operable to rotate the magnetic coupling members between rotational orientations; and the controller is further configured to operate the plurality of electromagnets to generate magnetic fields to rotate the magnetic coupling members between rotational orientations as the propeller rotates such that an effective rotational orientation of magnetic coupling members over the course of at least a partial rotation of the propeller is between two rotational orientations.

18. The propeller system of claim 16 wherein the magnetic coupling member comprises:

a body member comprising a circular perimeter;

a plurality of recesses formed in an exterior surface about the perimeter of the body member; and a plurality of permanent magnets, each permanent magnet being positioned and retained within a recess of the plurality of recesses.

19. A propeller system comprising:

a propeller comprising:

a central attachment member positioned at a rotational axis of the propeller; and a plurality of blade apparatuses, each blade apparatus of the plurality of blade apparatuses comprising:

a blade body attached to the central attachment member such that each blade apparatus may rotate about a radial axis of the propeller system independent of both the central attachment member and each other blade apparatus of the plurality of blade apparatuses; and a magnetic coupling member attached to a radially outward end of the blade body such that rotation of the magnetic coupling member along the radial axis of the propeller system may similarly rotate the blade body and lateral movement of the magnetic coupling member causes the blade body to rotate about the rotational axis of the propeller;

a propeller frame configured to at least partially circumscribe the magnetic coupling member of each blade apparatus of the plurality of blade apparatuses and defining an aperture within which each of the central attachment member and the plurality of blade apparatuses are positioned, the propeller frame having an outer diameter equal to or less than 36 inches;

an inner wall positioned intermediate the plurality of electromagnets and the blade body the plurality of blade apparatuses such that an airfoil gap is defined between the radially outward end of the blade body of each blade apparatus of the plurality of blade apparatuses and the inner wall;

an inlet cowling attached to and extending proximally from the propeller frame;

an outlet cowling attached to and extending distally from the propeller frame;

a plurality of electromagnets positioned on the propeller frame and operable to generate magnetic fields to suspend the magnetic coupling members, laterally translate the magnetic coupling members, and rotate the magnetic coupling members along the radial axis of the propeller system;

a power source coupled to the plurality of electromagnets and configured to provide power to the plurality of electromagnets for generation of magnetic fields thereby; and a controller coupled to the power source and configured to control operation of the plurality of electromagnets;

wherein a ratio of a maximum blade width between a leading edge of the blade body and a trailing edge of the blade body to a blade length of the blade body is within a range from 0.4 to 0.65; and wherein a ratio of a maximum blade thickness and a maximum blade width between a leading edge of the blade body and a trailing edge of the blade body is within a range from 0.15 to 0.22.

* * * * *